No. 848,153.  
PATENTED MAR. 26, 1907.  
L. W. BOWMAN.  
ELECTRICAL BLASTING MACHINE.  
APPLICATION FILED APR. 25, 1906.

WITNESSES:  
J. O. R. Kelly  
E. W. Miller

Lucien W. Bowman, INVENTOR  
BY  
Edw. Kelly, ATTORNEY

UNITED STATES PATENT OFFICE.

LUCIEN W. BOWMAN, OF READING, PENNSYLVANIA, ASSIGNOR OF ONE-HALF TO JOHN H. LEWIS, OF READING, PENNSYLVANIA.

ELECTRICAL BLASTING-MACHINE.

No. 848,153.　　Specification of Letters Patent.　　Patented March 26, 1907.

Application filed April 25, 1906. Serial No. 313,559.

*To all whom it may concern:*

Be it known that I, LUCIEN W. BOWMAN, a citizen of the United States, residing at Reading, in the county of Berks and State of Pennsylvania, have invented certain new and useful Improvements in Electrical Blasting-Machines, of which the following is a specification.

This invention relates to improvements in electrical blasting-machines; and the object is to provide a machine by means of which a number of blasting-cartridges may be exploded at a single operation.

A further object is to provide a machine in which the accidental discharge is reduced to a minimum.

My device consists of a series of connected storage batteries suitably housed in a closed casing, in which the circuit is closed by contacting the plugs on the ends of the firing-lines by inserting one of said plugs in a protected opening at one end of the casing and touching the plug on the other line to the exposed plate at the opposite end of the casing. By having the one contact-point protected I overcome all danger of accidental discharge. My present device is intended more particularly to replace the generators now used for this purpose. These generators are costly and require constant care and repairing. In my device the action is positive, as I do not depend on the generation of the current, which is often faulty.

The invention is more fully described in the following specifications and clearly illustrated in the accompanying drawing, in which—

Figure 1:
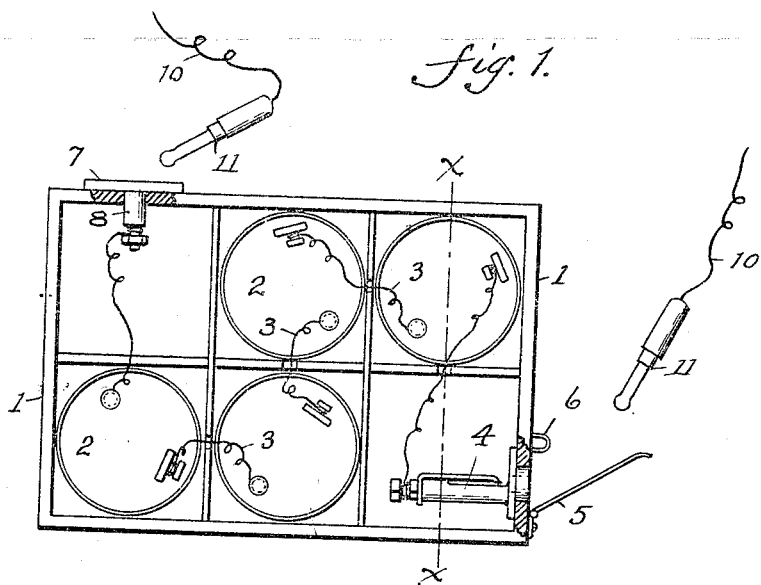
Figure 2:
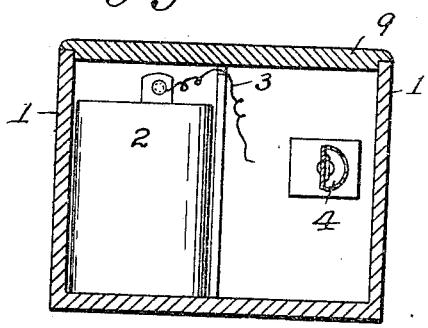

Figure 1 shows a plan view of my machine, and Fig. 2 is a sectional view of one end thereof.

The numeral 1 designates a rectangular casing divided into compartments. These compartments may be increased in number to suit the power of the machine desired. In each of these compartments, with the exception of the one at either end in which the contact-point is located, I provide a storage battery 2. These batteries are connected by wires 3. The numeral 4 designates a jack-plug inserted in the wall of the casing at one of the vacant compartments, and this plug is connected to the line of batteries 2. A hinged wing member 5 is provided at the outside of the casing, adapted to close the opening into this plug, and this wing engages a staple 6, on which a lock may be secured. At the opposite end of the casing I provide an exposed contact-plate 7, having a shank 8 leading into the vacant compartment at that end of the casing. This shank 8 is also connected to the line of batteries. The numeral 9 indicates a suitable cover for the casing. The firing-lines 10 are provided with plugs 11 at their extremities.

The operation is as follows: When it is desired to explode the cartridges with which the firing-lines are connected, the wing 5 is unlocked, thus uncovering the opening to the jack-plug 4, and one of the plugs 10 is inserted into this opening, making an electrical connection through the jack-plug. When the signal to "fire" is given, the plug 10 on the other firing-line is simply held against or wiped over the surface of the exposed contact-plate 7 and the circuit is closed, thus exploding all the cartridges with which the line is connected.

It is evident that a large number of cartridges may be exploded at a single operation by merely increasing the number of batteries, while, on the other hand, a very small number may be exploded without a waste of power.

Having thus fully described my invention, what I claim, and desire to secure by Letters Patent, is—

In combination with an open circuit having terminals, a receptacle containing a battery and having in one of its sides an opening, a plate attached to one of the sides of said receptacle and being exposed, a jack-plug located within the receptacle and registering with the opening thereof, a battery located within the box and having one of its poles connected with said jack-plug and its other pole connected with said plate, said jack-plug adapted to receive one of the circuit-terminals and the other circuit-terminal being adapted to be brought manually in contact with said plate, a door hinged to the receptacle and adapted to close over the opening thereof, and means for securing said door in closed position over said opening.

In testimony whereof I have signed my name to this specification in the presence of two subscribing witnesses.

LUCIEN W. BOWMAN.

Witnesses:
　ED. A. KELLY,
　J. O'R. KELLY.